United States Patent
Li et al.

(10) Patent No.: US 12,001,400 B2
(45) Date of Patent: Jun. 4, 2024

(54) METHOD AND APPARATUS FOR SYNCHRONIZING FILE

(71) Applicant: BOE TECHNOLOGY GROUP CO., LTD., Beijing (CN)

(72) Inventors: Bo Li, Beijing (CN); Hong Wang, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 341 days.

(21) Appl. No.: 17/312,965

(22) PCT Filed: Aug. 11, 2020

(86) PCT No.: PCT/CN2020/108451
§ 371 (c)(1),
(2) Date: Jun. 11, 2021

(87) PCT Pub. No.: WO2021/077862
PCT Pub. Date: Apr. 29, 2021

(65) Prior Publication Data
US 2022/0050811 A1 Feb. 17, 2022

(30) Foreign Application Priority Data
Oct. 25, 2019 (CN) .......................... 201911023258.2

(51) Int. Cl.
G06F 16/178 (2019.01)
G06F 3/14 (2006.01)
G06F 8/65 (2018.01)
G06F 9/445 (2018.01)
G06F 16/182 (2019.01)

(52) U.S. Cl.
CPC .............. *G06F 16/178* (2019.01); *G06F 3/14* (2013.01); *G06F 8/65* (2013.01); *G06F 9/44526* (2013.01); *G06F 16/183* (2019.01)

(58) Field of Classification Search
CPC . G06F 16/178; G06F 3/14; G06F 8/65; G06F 9/44526; G06F 16/183
USPC ........ 707/610, 611, 612, 617, 620, 624, 626
See application file for complete search history.

(56) References Cited

U.S. PATENT DOCUMENTS

| 9,973,374 | B1* | 5/2018 | Ratias | H04W 12/068 |
| 2006/0259521 | A1* | 11/2006 | Armenta | G06F 16/182 |
| | | | | 707/999.201 |
| 2007/0038642 | A1* | 2/2007 | Durgin | G06F 16/27 |
| | | | | 707/999.01 |

(Continued)

*Primary Examiner* — Phong H Nguyen
(74) *Attorney, Agent, or Firm* — Lippes Mathias LLP

(57) ABSTRACT

A method for synchronizing a file includes acquiring a first synchronization instruction for a target application. The first synchronization instruction is used to instruct to synchronize a target file generated by the target application to a server of an auxiliary application, the target application is a graphics drawing application, and the auxiliary application is a product lifecycle management (PLM) application. The method includes acquiring the target file based on the first synchronization instruction and sending a second synchronization instruction carrying the target file to the server based on a target interface of a synchronization plug-in of the target application. The target interface of the synchronization plug-in is configured to communicate with the server.

16 Claims, 10 Drawing Sheets

(56) References Cited

U.S. PATENT DOCUMENTS

2012/0105449 A1* 5/2012 Buchowski ............. G06T 19/20
                                                      345/420
2018/0322138 A1* 11/2018 Chang .................. H04N 1/4486
2019/0005142 A1* 1/2019 Tseng ...................... H04L 67/02
2019/0318276 A1* 10/2019 Rouveure .............. G06Q 10/02

* cited by examiner

FIG. 5

METHOD AND APPARATUS FOR SYNCHRONIZING FILE

CROSS-REFERENCE TO RELATED APPLICATION

The present disclosure is a 371 of PCT Application No. PCT/CN2020/108451, filed on Aug. 11, 2020, which claims priority to Chinese Patent Application No. 201911023258.2, filed on Oct. 25, 2019 and entitled "METHOD AND APPARATUS FOR SYNCHRONIZING FILE", the disclosures of which are herein incorporated by reference in their entireties.

TECHNICAL FIELD

The present disclosure relates to the field of software technologies, and in particular to a method and an apparatus for synchronizing a file.

BACKGROUND

Currently, a target application and an auxiliary application are usually installed in a terminal. The target application can be configured for two-dimensional drawing, document design and three-dimensional design, to generate a variety of files (for example, two-dimensional files, three-dimensional files, etc.). The auxiliary application can be configured to synchronize files generated by the target application to a server corresponding to the auxiliary application, so as to facilitate the sharing of the files.

In the related art, the files generated by the target application are usually saved locally to the terminal at first. After detecting a start instruction from a user for the auxiliary application, the terminal can start the auxiliary application, and then synchronize the files stored locally in the terminal to the server through the auxiliary application.

SUMMARY

In an aspect, a method for synchronizing a file is provided. The method includes:

acquiring a first synchronization instruction for a target application, wherein the first synchronization instruction is used to instruct to synchronize a target file generated by the target application to a server of an auxiliary application, the target application is a graphics drawing application, and the auxiliary application is a product lifecycle management (PLM) application;

acquiring the target file based on the first synchronization instruction; and sending a second synchronization instruction carrying the target file to the server based on a target interface of a synchronization plug-in of the target application, wherein the target interface of the synchronization plug-in is configured to communicate with the server.

In another aspect, an apparatus for synchronizing a file is provided. The apparatus includes:

a first acquiring module, configured to acquire a first synchronization instruction for a target application, wherein the first synchronization instruction is used to instruct to synchronize a target file generated by the target application to a server of an auxiliary application, the target application is a graphics drawing application, and the auxiliary application is a product lifecycle management (PLM) application;

a second acquiring module, configured to acquire the target file based on the first synchronization instruction; and a sending module, configured to send a second synchronization instruction carrying the target file to the server based on a target interface of a synchronization plug-in of the target application, wherein the target interface of the synchronization plug-in is configured to communicate with the server.

In yet another aspect, an apparatus for synchronizing a file is provided. The apparatus includes: a memory, a processor, and a computer program stored on the memory, wherein the processor, when executing the computer program, implements the method for synchronizing a file according to the above aspect.

In yet another aspect, a system for synchronizing a file is provided. The system for synchronizing a file includes: a terminal and a server, wherein the terminal includes the apparatus for synchronizing a file according to the above aspect.

In yet another aspect, a computer-readable storage medium is provided. The computer-readable storage medium stores instructions therein, wherein the instructions, when running on a computer, causes the computer to execute the method for synchronizing a file according to the above aspect.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 5 is a schematic diagram of a code acquisition interface according to an embodiment of the present disclosure;

DETAILED DESCRIPTION

For clearer descriptions of the objectives, technical solutions, and advantages of the present disclosure, embodiments of the present disclosure are described in detail hereinafter with reference to the accompanying drawings.

In the related art, since the terminal needs to start an auxiliary application in the process of synchronizing files to the server, the efficiency of synchronizing files to the server is relatively low.

Figure 1:
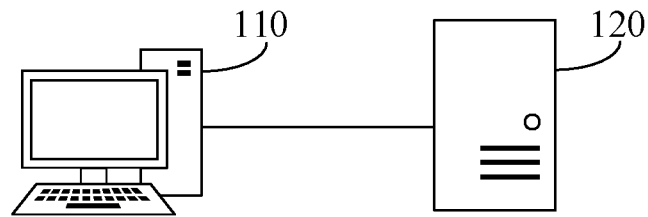
FIG. 1 is a schematic diagram of an implementation environment involved in various embodiments of the present disclosure.

FIG. 1 is a schematic diagram of an implementation environment involved in various embodiments of the present disclosure. As shown in FIG. 1, the implementation environment may include: a terminal 110 and a server 120. The terminal 110 may be a device installed with a target application, such as a personal computer, a notebook computer, a tablet computer, a wearable device, a mobile phone, or the like. Optionally, the target application may be an application for generating files. The server 120 may be a server, or a server cluster composed of several servers, or a cloud computing service center. A communication connection may be established through a wired network or a wireless network between the terminal 110 and the server 120.

Figure 2:
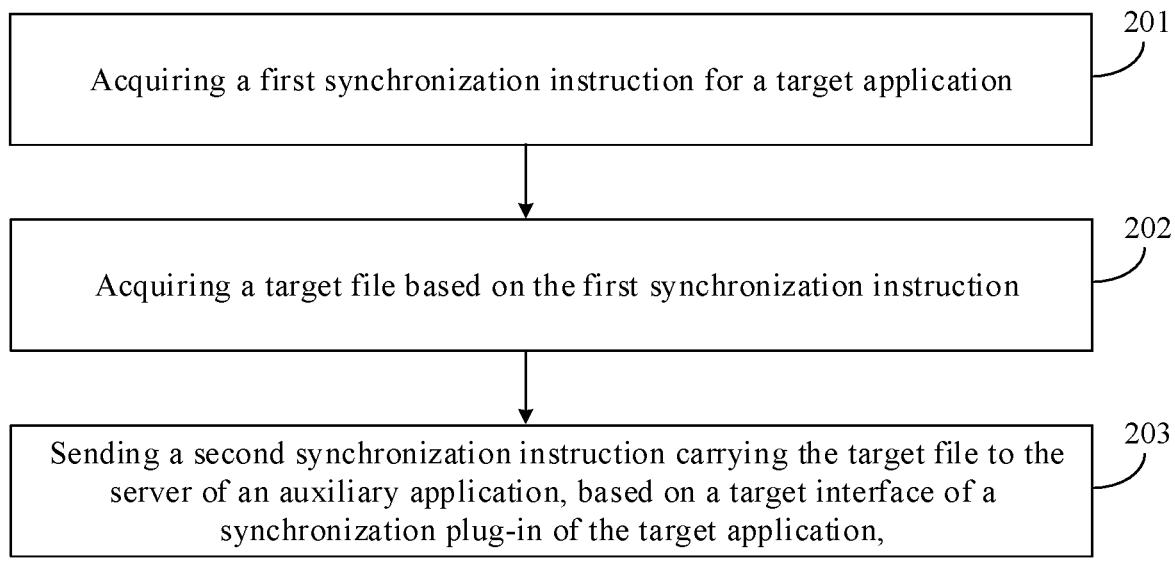
FIG. 2 is a flowchart of a method for synchronizing a file according to an embodiment of the present disclosure.

FIG. 2 is a flowchart of a method for synchronizing a file according to an embodiment of the present disclosure. The method for synchronizing a file may be applicable to the terminal 110 shown in FIG. 1. As shown in FIG. 2, the method may include the following steps.

In step 201, a first synchronization instruction for a target application is acquired.

The first synchronization instruction is used to instruct to synchronize a target file generated by the target application to the server of the auxiliary application.

In the embodiment of the present disclosure, the terminal may acquire the first synchronization instruction for the target application after receiving a trigger operation of a user on the target application. The trigger operation may be a click operation or a sliding operation of the user on the target application.

The target application may be a graphics drawing application for generating files. For example, the target application may be a computer aided design (CAD) application. Correspondingly, the target file may be a drawing (DWG) format file. A synchronization plug-in may be installed in the target application. The synchronization plug-in has a target interface. The target interface is configured to establish a connection with the server of the auxiliary application, and then communicate with the server of the auxiliary application. The auxiliary application may be a PLM application, and the PLM application can synchronize the file generated by the target application to the server.

In step 202, a target file is acquired based on the first synchronization instruction.

After acquiring the first synchronization instruction for the target application, the terminal may acquire the target file based on the first synchronization instruction. Optionally, the target file is stored locally in the terminal in advance.

In step 203, a second synchronization instruction carrying the target file is sent to the server of the auxiliary application, based on a target interface of the synchronization plug-in of the target application.

After acquiring the target file, the terminal may send the second synchronization instruction carrying the target file to the server based on the target interface of the synchronization plug-in.

In summary, the embodiment of the present disclosure provides a method for synchronizing a file. The terminal can acquire the target file based on the first synchronization instruction for the target application, and send the second synchronization instruction carrying the target file to the server based on the target interface of the synchronization plug-in. The terminal can synchronize the target file to the server through the target application for generating the target file in the process of synchronizing the target file to the server, without the need to start the auxiliary application. Therefore, the efficiency of synchronizing the file to the server is improved.

Figure 3:
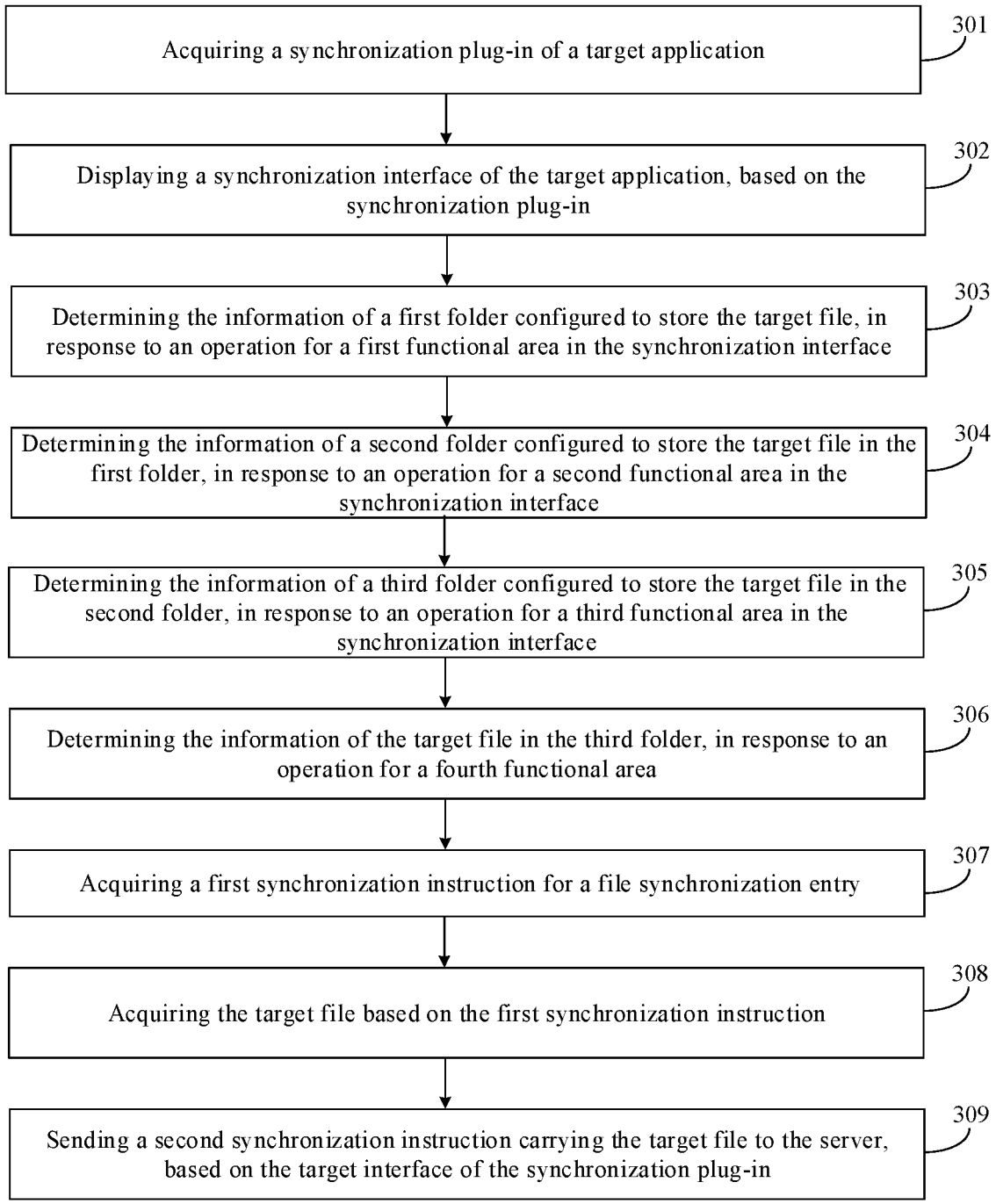
FIG. 3 is a flowchart of another method for synchronizing a file according to an embodiment of the present disclosure.

FIG. 3 is a flowchart of another method for synchronizing a file according to an embodiment of the present disclosure. The method for synchronizing a file may be applicable to the terminal 110 shown in FIG. 1. As shown in FIG. 3, the method may include the following steps.

In step 301: a synchronization plug-in of the target application is acquired.

In the embodiment of the present disclosure, the target application and the auxiliary application may be installed in the terminal. The target application is configured to generate files, and the auxiliary application is configured to synchronize the files generated by the target application to the server corresponding to the auxiliary application, thereby facilitating sharing of the files.

A display interface of the target application may also display a login interface, and the login interface may include a user name input box, a password input box, and an OK button. After the terminal acquires the synchronization plug-in of the target application, a user may input a target user name through the user name input box, and input a target password through the password input box. Correspondingly, the terminal may acquire the target user name input by the user from the user name input box, and acquire the target password input by the user from the password input box. After detecting a selection instruction of the user for the OK button, the terminal may send the acquired target user name and target password to a plug-in server. After successfully verifying the target user name and target password sent by the terminal, the plug-in server may send a verification success instruction to the terminal.

Optionally, the display interface of the target application may further include a synchronization plug-in acquisition button. After receiving the verification success instruction sent by the server, the terminal may send a synchronization plug-in acquisition instruction to the plug-in server if detecting the selection instruction of the user for the synchronization plug-in acquisition button. After receiving the synchronization plug-in acquisition instruction sent by the terminal, the plug-in server may acquire the synchronization plug-in, and send the acquired synchronization plug-in to the terminal. The terminal may receive and store the synchronization plug-in sent by the plug-in server. In the embodiment of the present disclosure, after receiving the synchronization plug-in acquisition instruction sent by the terminal, the plug-in server may also acquire a first version number of the synchronization plug-in, and send the first version number together with the synchronization plug-in to the terminal. Correspondingly, the terminal may receive and store the first version number of the synchronization plug-in.

The synchronization plug-in of the target application has a target interface. The target interface is configured to establish a connection with the server of the auxiliary application, and then communicate with the server of the auxiliary application. Optionally, the target interface is a software interface between the terminal and the server, and includes some information, such as an address of the server, an interface number of the server, or a communication protocol, agreed by the terminal and the server and related to the communication between the terminal and the server.

In the embodiment of the present disclosure, the terminal may further update the acquired synchronization plug-in of the target application. The display interface of the target application may further include a synchronization plug-in update button. After detecting the selection instruction of the user for the synchronization plug-in update button, the terminal may send a synchronization plug-in update instruction to the plug-in server. After receiving the synchronization plug-in update instruction, the plug-in server may send a stored second version number of the synchronization plug-in to the terminal. After receiving the second version number of the synchronization plug-in sent by the plug-in server, the terminal may compare the second version number of the synchronization plug-in with the first version number of the synchronization plug-in stored by the terminal in advance.

If the second version number is the same as the first version number, the terminal sends an instruction indicating the same version number to the plug-in server. After receiving the instruction indicating the same version number, the plug-in server may determine that the synchronization plug-in of the latest version is installed in the terminal, and there is no need to update the synchronization plug-in in the terminal.

If the second version number is greater than the first version number, the terminal may send an update determining instruction to the plug-in server. After receiving the update determining instruction sent by the terminal, the plug-in server may send the synchronization plug-in, whose version number is the second version number, to the terminal. After receiving the synchronization plug-in, whose version number is the second version number, the terminal may update the synchronization plug-in of the first version number based on the synchronization plug-in, whose version number is the second version number.

For example, the first version number may be 10.1.0.0, and the second version number may be 10.1.0.1. Optionally, the terminal may perform a punctuation removal processing on the first version number and the second version number, and compare the size of the first version number with the size of the second version number after the punctuation removal a reverse order. That is, the terminal may sequentially compare the size of the first version number with the size of the second version number after the punctuation removal in the order of the number of digits from low to high. For example, the terminal may remove the punctuation mark "." in the first version number and the second version number, and then compare the size of 0 in the first version number with the size of 1 in the second version number after the punctuation removal. Since 1>0, the terminal can determine that the second version number is greater than the first version number.

Optionally, the terminal according to the embodiment of the present disclosure may be or may not be installed with the auxiliary application, which is not limited in the embodiment of the present disclosure.

In step 302, a synchronization interface of the target application is displayed based on the synchronization plug-in.

In the embodiment of the present disclosure, after acquiring the synchronization plug-in of the target application, the terminal may display a menu page of the synchronization plug-in based on the synchronization plug-in. The menu page may include a folder creation option. The terminal may display the synchronization interface of the target application after detecting a selection instruction of the user for the folder creation option.

In step 303, the information of a first folder configured to store the target file is determined, in response to an operation for a first functional area in the synchronization interface.

Figure 4:
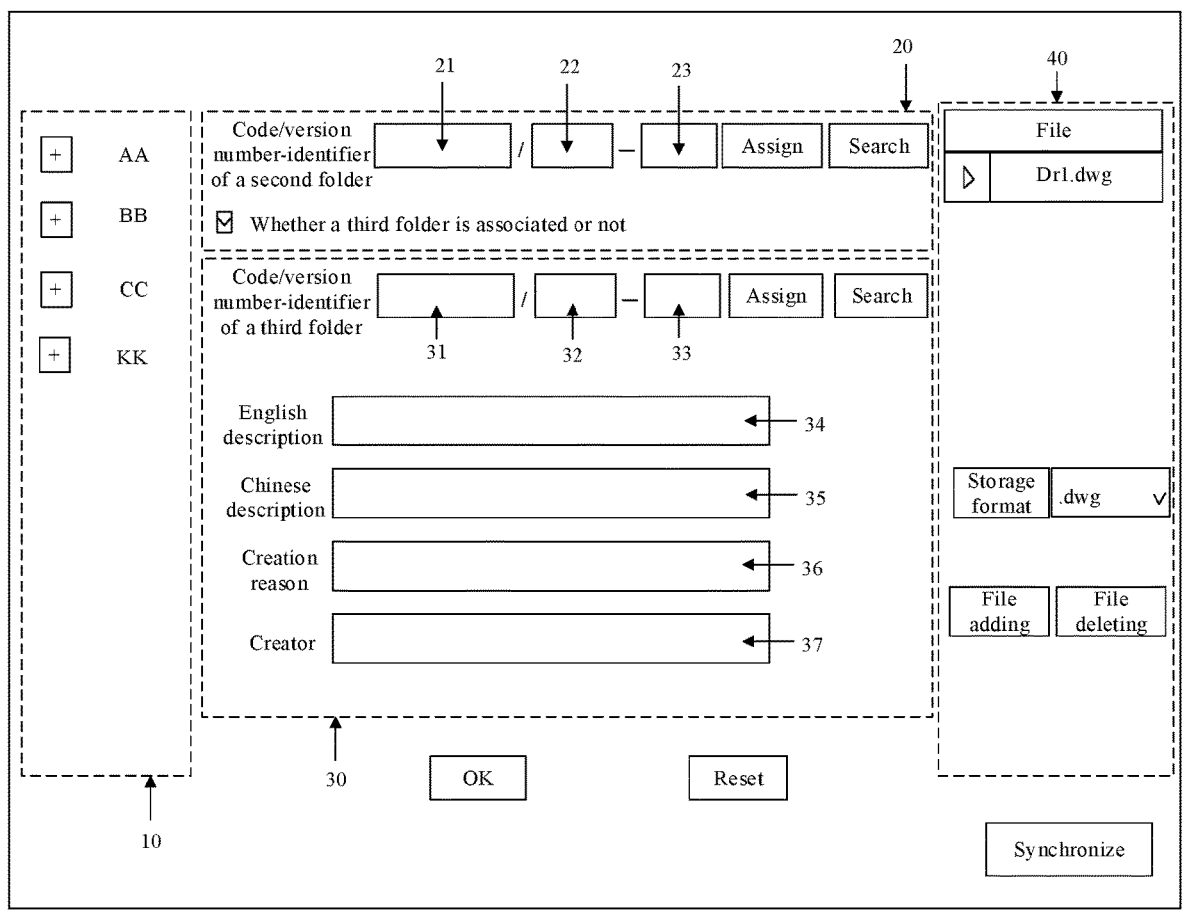
FIG. 4 is a schematic diagram of a synchronization interface according to an embodiment of the present disclosure.

In the embodiment of the present disclosure, as shown in FIG. 4, the synchronization interface may include the first functional area 10, and the first functional area 10 is configured to set information of the first folder. The first folder is configured to store the target file. The first functional area 10 may display a plurality of folders in the server. When detecting a selection instruction for any one of the plurality of folders, the terminal may determine the folder indicated by the selection instruction as the first folder, and determine an identifier of the first folder as the information of the first folder.

For example, as shown in FIG. 4, the plurality of folders include a folder AA, a folder BB, a folder CC, and a folder KK. When detecting the selection instruction for the folder KK in the plurality of folders, the terminal may determine the folder KK as the first folder, and determine the identifier of the folder KK as the information of the first folder. Optionally, the identifier of the first folder may be the name of the first folder. For example, the identifier of the first folder may be KK.

Optionally, a folder new button may further be displayed in the first functional area. After detecting a selection instruction of the user for the folder new button, the terminal may create a new folder, determine the new folder as the first folder, and determine the identifier of the new folder as the information of the first folder.

In step 304, the information of a second folder configured to store the target file in the first folder is determined, in response to an operation for a second functional area in the synchronization interface.

In the embodiment of the present disclosure, referring to FIG. 4, the synchronization interface may further include a second functional area 20, which is configured to set information of the second folder. The second folder is a folder configured to store the target file in the first folder. After determining the first folder, the terminal may acquire the information of the second folder in response to the operation for the second functional area, and determine the second folder based on the information of the second folder. The information of the second folder may include at least one of a code, a version number, or an identifier of the second folder. The embodiment of the present disclosure is illustrated by taking an example in which the information of the second folder includes the code, the version number, and the identifier of the second folder.

Referring to FIG. 4, the second functional area 20 may include a code acquisition box 21 of the second folder, a version number acquisition box 22 of the second folder, an identifier acquisition box 23 of the second folder, and an assignment button. The user may click the assignment button. Correspondingly, after detecting the selection instruction for the assignment button, the terminal may send a code acquisition instruction and a version number acquisition instruction of the second folder to the server. After receiving the code acquisition instruction and the version number acquisition instruction of the second folder, the server may acquire the code of the second folder, and generate the version number of the second folder according to a version number generation rule. Afterwards, the server may send the code and the version number of the second folder to the terminal.

After receiving the code and version number of the second folder sent by the server, the terminal may display the code of the second folder in the code acquisition box 21, and display the version number of the second folder in the version number acquisition box 22. Afterwards, the user may input the identifier of the second folder in the identifier acquisition box 23. Correspondingly, the terminal may acquire and display text information input by the user in the identifier acquisition box 23, and determine the acquired text information as the identifier of the second folder. The identifier of the second folder may be the name of the second folder. For example, the identifier of the second folder may be WW.

Optionally, the second folder may be a folder which has already been in the first folder, or a new folder in the first folder. On one hand, if the second folder is newly created in the first folder, after detecting the selection instruction of the user for the assignment button, the terminal may send the acquisition instruction of a code acquisition interface to the server. After receiving the acquisition instruction of the code acquisition interface, the server may send the code acquisition interface to the terminal. Correspondingly, the terminal may receive and display the code acquisition interface, and acquire the code of the second folder through the code acquisition interface. On the other hand, if a folder which has been in the first folder is determined as the second folder, the user may input the identifier of the second folder in the identifier acquisition box 23. Correspondingly, the terminal may acquire and display the text information input by the user in the identifier acquisition box 23. Then, the user may click a search button. Correspondingly, after detecting the selection instruction of the user for the search button, the terminal may send a search instruction carrying text information to the server. After receiving the search instruction sent by the terminal, the server may acquire the code and version number of the second folder based on the text information, and send the acquired code and version number of the second folder to the terminal. After receiving the code and version number of the second folder sent by the server, the terminal may display the received code of the second folder in the code acquisition box 21, and display the received version number of the second folder in the version number acquisition box 22.

Figure 5:
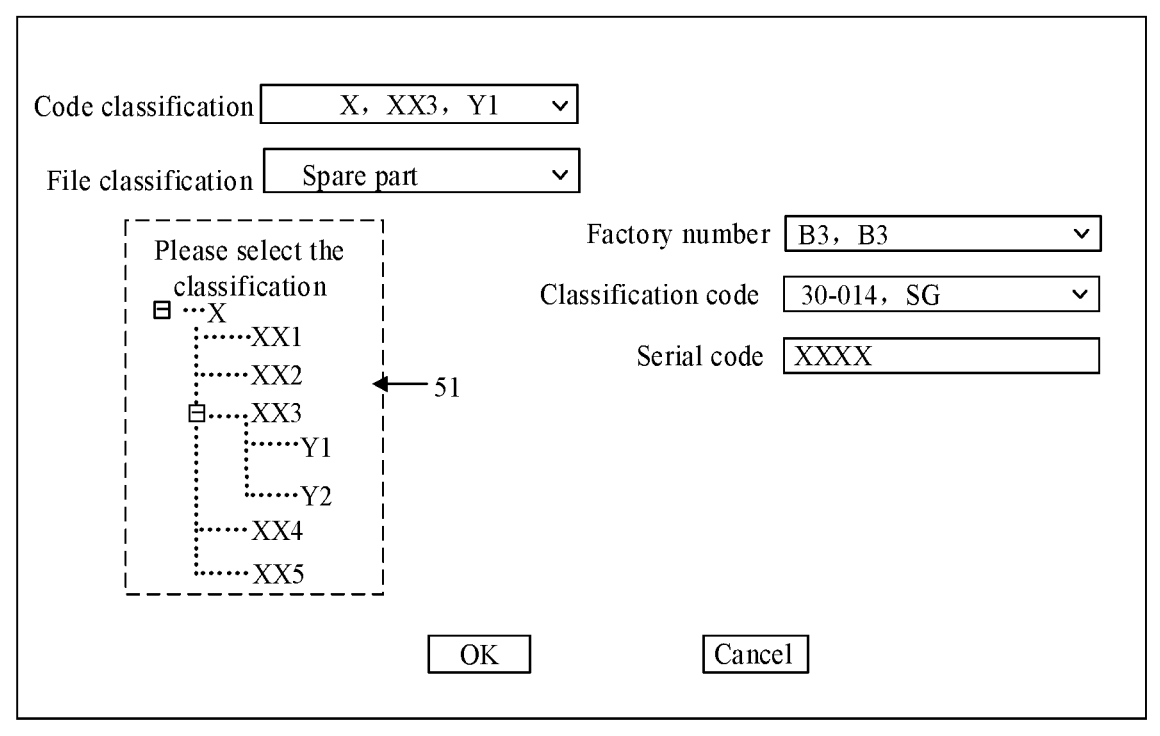

As shown in FIG. 5, the code acquisition interface may include a code classification option, a file classification option, and a code classification selection area 51. The code classification selection area 51 may display a plurality of candidate code classifications. In addition, the plurality of candidate code classifications may be divided into at least one category, wherein the code classification of each category may be further divided into a plurality of different subcategories. The code classification option is configured to display the code classification selected in the code classification selection area 51.

FIG. 5 takes the case that the selected code classifications are X, XX3 and Y1 as an example for description. Referring to FIG. 5, after detecting a selection instruction for the code classification option, the terminal may display a first-level classification X in the code classification selection area 51. After detecting a selection instruction for the first-level classification X in the code classification selection area 51, the terminal may display a second-level classification XX1, a second-level classification XX2, a second-level classification XX3, a second-level classification XX4, and a second-level classification XX5 which are included in the first-level classification X in the code classification selection area 51. After detecting a selection instruction for a third-level classification XX3 in the code classification selection area 51, the terminal may display a third-level classification Y1 and a third-level classification Y2 which are included in the second-level classification XX3 in the code classification selection area 51. After detecting a selection instruction of a user for the third-level classification Y1 in the code classification selection area 51, the terminal may determine the acquired third-level classification Y1 in the second-level classification XX3 in the first-level classification X as the code classification of the second folder.

After detecting the selection instruction for the file classification option, the terminal may display a file type list (not shown in FIG. 5). A plurality of candidate file types are displayed in the file type list. In addition, the terminal, after receiving a selection instruction of the user for a target file type in the file type list, may determine the target file type as the classification of the target file. For example, in FIG. 5, the case that the classification of the target file (that is, the target file type selected by the user) is a spare part is taken as an example.

Optionally, the code of the second folder may include a classification code and a serial code. Correspondingly, referring to FIG. 5, the code acquisition interface may also include a classification code option and a serial code acquisition box. After detecting a selection instruction for the classification code option, the terminal may display a classification code list (not shown in FIG. 5). A plurality of candidate classification codes are displayed in the classification code list. In addition, the terminal may determine a target classification code as the classification code of the second folder after receiving a selection instruction for the target classification code in the classification code list. The classification code may be used to indicate the classification of materials. The materials are contents embodied in the file. For example, the classification code may be 30-014, SG. The terminal may automatically generate the serial code of the second folder, and display the generated serial code in the serial code acquisition box. For example, the serial code may be XXXX, and the X may be a number or a letter.

As shown in FIG. 5, the code acquisition interface may also include a factory number option. After detecting a selection instruction of the user for the factory number option, the terminal may display a factory number list, and the factory number list may display a plurality of candidate factory numbers. In addition, the terminal may determine a target factory number as the factory number of the second folder after receiving a selection instruction for the target factory number in the factory number list. The factory number is used to indicate the factory number to which the user synchronizing the target file belongs. For example, the factory number may be B3, B3, wherein B is used to indicate a department number of a factory.

In the embodiment of the present disclosure, the first functional area and the second functional area are integrated on one interface (the above synchronization interface). Therefore, compared with the case that the first functional area and the second functional area are respectively set on different interfaces, the efficiency of determining the first folder and the second folder is effectively improved, and meanwhile, the efficiency of acquiring the information of the first folder and the information of the second folder is improved.

In the embodiment of the present disclosure, referring to FIG. 4, the second functional area 20 may further include a button for associating a third folder or not. If the terminal detects a selection instruction for the button for associating the third folder or not, a third functional area may be set to an editable state, and step 305 is executed. If the terminal does not detect a selection instruction for the button for associating the third folder or not, the third functional area is in a non-editable state.

In step 305, the information of the third folder configured to store the target file in the second folder is determined, in response to an operation for the third functional area in the synchronization interface.

When the third functional area is in an editable state, the terminal may, in response to the operation for the third functional area, determine the third folder and acquire the information of the third folder. The information may include at least one of a code, a version number, an identifier, an English description, a Chinese description, a creation reason, or a creator of the third folder.

Referring to FIG. 4, the synchronization interface may further include a third functional area 30, which is configured to set information of the third folder. The third folder is a file configured to store the target file in the second folder. As shown in FIG. 4, the third functional area 30 may include a code acquisition box 31 of the third folder, a version number acquisition box 32 of the third folder, an identifier acquisition box 33 of the third folder, an English description box 34, a Chinese description box 35, a creation reason acquisition box 36, a creator acquisition box 37, an assignment button, and a search button.

In the embodiment of the present disclosure, after detecting a selection instruction for the assignment button in the third functional area 30, the terminal may send a code acquisition instruction and a version number acquisition instruction of the third folder to the server. After receiving the code acquisition instruction and the version number acquisition instruction of the third folder sent by the terminal, the server may generate the code of the third folder according to a code generation rule, and generate the version number of the third folder according to a version number generation rule. Afterwards, the server may send the generated code and version number of the third folder to the terminal.

After receiving the code and version number of the third folder sent by the server, the terminal may display the code of the third folder in the code acquisition box 31 of the third folder, and then display the received version number of the third folder in the version number acquisition box 32 of the third folder. Afterwards, the user may input text information in the identifier acquisition box 33 of the third folder. Correspondingly, the terminal may receive and display the text information in the identifier acquisition box 33, and determine the text information as the identifier of the third folder. The identifier of the third folder may be the name of the third folder.

Optionally, the terminal may determine the information acquired from the English description acquisition box 34 as the English description of the third folder, determine the information acquired from the Chinese description acquisition box 35 as the Chinese description of the third folder, determine the information acquired from the creation reason acquisition box 36 as the creation reason of the third folder, and determine the information acquired from the creator acquisition box 37 as the creator of the third folder. Afterwards, if detecting a selection instruction for the OK button in the third functional area, the terminal may store the information of the second folder and the information of the third folder. If the terminal detects a selection instruction for a reset button, the information of the second folder displayed in the second functional area 20 and the information of the third folder displayed in the third functional area 30 may be deleted.

In the embodiment of the present disclosure, the first functional area, the second functional area, and the third functional area are integrated on one interface (i.e., the above synchronization interface). Therefore, compared with the case that the first functional area, the second functional area, and the third functional area are respectively set on different interfaces, the efficiency of determining the third folder is effectively improved, and meanwhile, the efficiency of determining the information of the third folder is improved.

In step 306, the information of the target file in the third folder is determined, in response to an operation for a fourth functional area.

Referring to FIG. 4, the synchronization interface may further include a fourth functional area 40, which is configured to select the target file from files generated by the target application. In the embodiment of the present disclosure, after determining the third folder, the terminal may determine the target file in response to an operation for the fourth functional area, and determine the information of the target folder. The information of the target file may include an identifier of the target file, and may also include a storage format of the target file.

Referring to FIG. 4, the fourth functional area 40 may include a file adding button, a file deleting button, and a file storage format option. After the terminal detects a selection instruction for the file adding button, a plurality of files generated by the target application may be locally acquired from the terminal. After receiving a selection instruction of the user for any one of the plurality of files, the terminal may determine the file indicated by the selection instruction as the target file, and display the identifier of the target file and the storage format of the target file in the fourth functional area 40. For example, the identifier of the target file may be Dr1, and the storage format of the target file may be dwg.

Optionally, after detecting a selection instruction for the storage format option, the terminal may display a plurality of candidate file formats. In addition, after receiving a selection instruction for the target format dwg, the terminal may determine the target format dwg as the storage format of the target file. After the terminal detects a selection instruction for the target file displayed in the fourth functional area 40, if a selection instruction for a delete button is detected, the terminal may delete the target file from the fourth functional area 40.

In step 307, a first synchronization instruction for a file synchronization entry is acquired.

The synchronization interface may further include a file synchronization entry, and the file synchronization entry may be the synchronization button as shown in FIG. 4. After detecting a selection instruction for the synchronization button, the terminal may acquire the first synchronization instruction for the file synchronization entry. The first synchronization instruction is used to instruct to synchronize the target file generated by the target application to the server. The synchronization button in the interface shown in FIG. 4 is configured to instruct to synchronize the target file generated by the target application to the server.

In step 308, the target file is acquired based on the first synchronization instruction.

After acquiring the first synchronization instruction for the file synchronization entry, the terminal may acquire the local target file based on the first synchronization instruction. Optionally, the terminal may acquire the target file displayed in the fourth functional area 40.

In step 309, based on the target interface of the synchronization plug-in, a second synchronization instruction carrying the target file is sent to the server.

After acquiring the target file, the terminal may send the second synchronization instruction carrying the target file to the server based on the target interface of the synchronization plug-in, so that the server stores the target file.

In the embodiment of the present disclosure, the synchronization interface may only include the first functional area and the fourth functional area. Alternatively, the synchronization interface may also only include the first functional area, the second functional area, and the fourth functional area. Alternatively, the synchronization interface may also include the first functional area, the second functional area, the third functional area, and the fourth functional area. The number and types of the functional areas included in the synchronization interface are not limited in the embodiment of the present disclosure.

Optionally, if the synchronization interface includes the first functional area and the fourth functional area, the second synchronization instruction also carries the information of the first folder. After receiving the second synchronization instruction sent by the terminal, the server may store the target file in the first folder, and store the information of the first folder in correspondence to the identifier of the target file. The identifier of the target file may be the name of the target file.

Optionally, if the synchronization interface includes the first functional area, the second functional area, and the fourth functional area, the second synchronization instruction also carries the information of the first folder and the information of the second folder. After receiving the second synchronization instruction sent by the terminal, the server may store the target file in the second folder, and store the information of the first folder and the information of the second folder in correspondence to the identifier of the target file.

If the synchronization interface further includes the first functional area, the second functional area, the third functional area, and the fourth functional area, the second synchronization instruction may also carry the information of the first folder, the information of the second folder, and the information of the third folder. After receiving the second synchronization instruction sent by the terminal, the server may store the target file in the third folder, and store the information of the first folder, the information of the second folder and the information of the third folder in correspondence to the identifier of the target file.

In summary, the embodiment of the present disclosure provides a method for synchronizing a file. After acquiring the synchronization plug-in of the target application, the terminal may acquire the target file based on the first synchronization instruction for the target application, and send the second synchronization instruction carrying the target file to the server based on the target interface of the synchronization plug-in. The terminal can synchronize the target file to the server through the target application for generating the target file in the process of synchronizing the target file to the server. Therefore, there is no need to start the auxiliary application, which improves the efficiency of synchronizing the file to the server.

Figure 6:
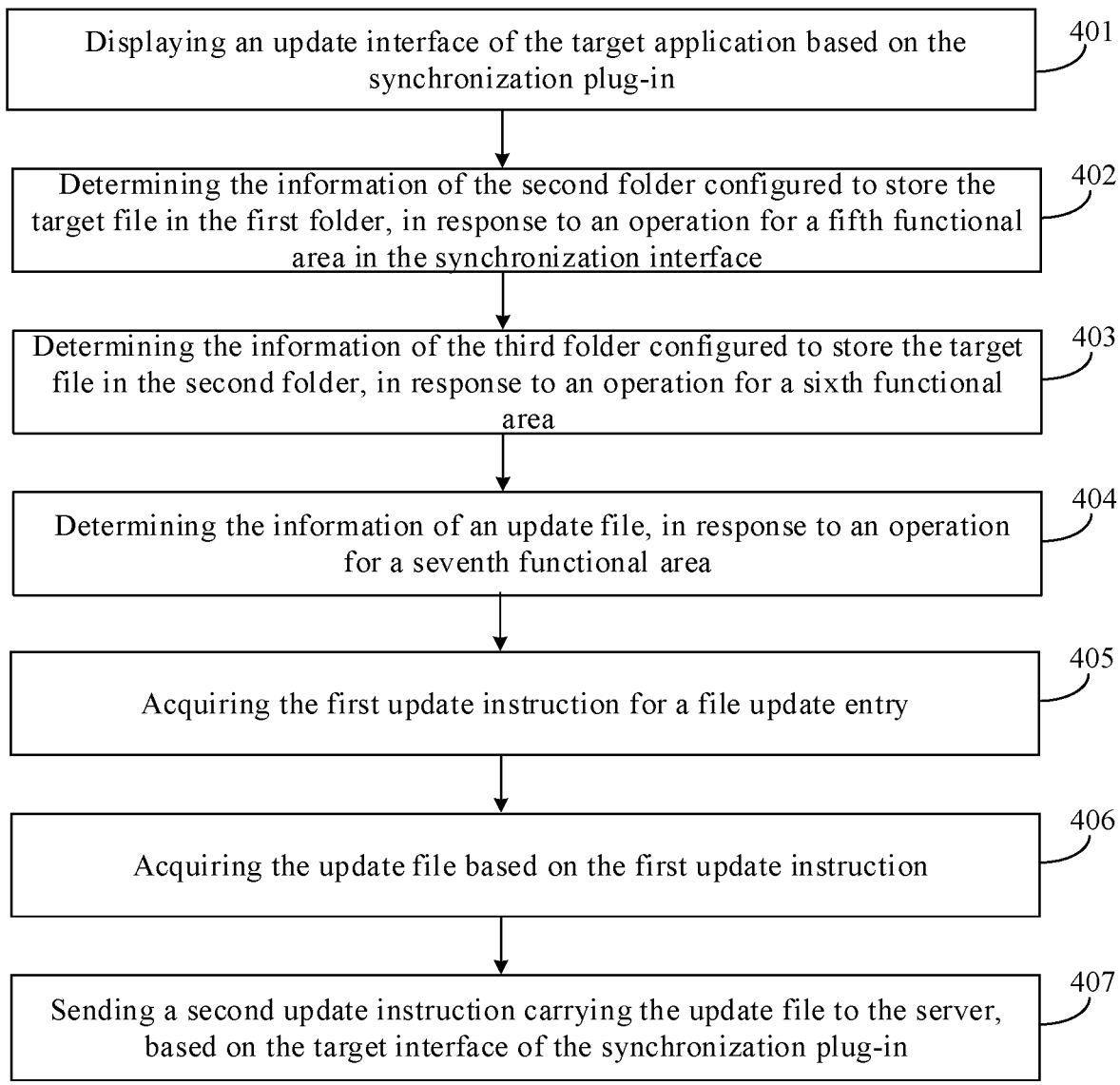
FIG. 6 is a flowchart of yet another method for synchronizing a file according to an embodiment of the present disclosure.

FIG. 6 is a flowchart of another method for synchronizing a file according to the embodiment of the present disclosure, and the method may be applicable to the terminal 110 shown in FIG. 1. As shown in FIG. 6, the method may include the following steps.

In step 401, an update interface of the target application is displayed based on the synchronization plug-in.

In the embodiment of the present disclosure, a menu page of the synchronization plug-in may further include an update option. After detecting a selection instruction for the update option, the terminal may display the update interface of the target application based on the synchronization plug-in.

In step 402, in response to an operation for a fifth functional area in the synchronization interface, the information of the second folder configured to store the target file in the first folder is determined.

Figure 7:
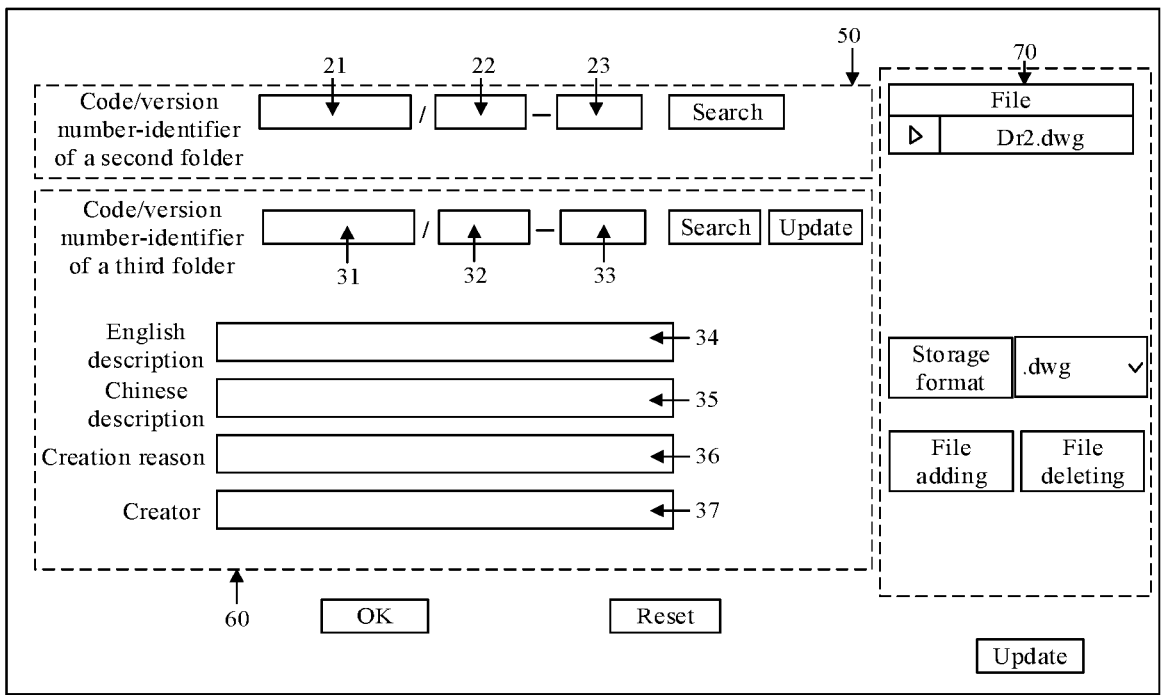
FIG. 7 is a schematic diagram of an update interface according to an embodiment of the present disclosure.

As shown in FIG. 7, the update interface may include a fifth functional area 50, and the fifth functional area 50 is configured to select the second folder in the server and determine the information of the second folder.

Referring to FIG. 7, the fifth functional area 50 may include a code acquisition box 21 of the second folder, a version number acquisition box 22 of the second folder, an identifier acquisition box 23 of the second folder, and a search button. Optionally, the user may input the identifier of the second folder in the identifier acquisition box 23 of the second folder. Correspondingly, after acquiring the identifier of the second folder input by the user in the fifth functional area 50, the terminal may, if detecting a selection instruction for the search button, send a search instruction carrying the identifier of the second folder to the server. After receiving the search instruction, the server may acquire the information of the second folder based on the identifier of the second folder, and send the acquired information of the second folder to the terminal. The information of the second folder may include the identifier and version number of the second folder.

In step 403, in response to an operation for a sixth functional area, the information of the third folder configured to store the target file in the second folder is determined.

Referring to FIG. 7, the update interface may further include a sixth functional area 60, which is configured to select the third folder in the server and determine the information of the third folder. The sixth functional area 60 may include a code acquisition box 31 of the third folder, a version number acquisition box 32 of the third folder, an identifier acquisition box 33 of the third folder, and a search button.

In the embodiment of the present disclosure, the user may input text information in the identifier acquisition box 33. Correspondingly, the terminal may receive the text information input by the user in the identifier acquisition box 33, and determine the acquired text information as the identifier of the third folder. For example, the identifier of the third folder may be MM. After detecting a selection instruction of the user for the search button, the terminal may send a search instruction carrying the identifier of the third folder to the server. After receiving the identifier of the third folder, the server may acquire the information of the third folder based on the identifier of the third folder, and send the acquired information of the third folder to the terminal. After receiving the information of the third folder sent by the server, the terminal may display the information of the third folder in the sixth functional area 60. As shown in FIG. 6, the information of the third folder may include at least one of a code, a version number, an identifier, an English description, a Chinese description, a creation reason, or a creator of the third folder.

In step 404, in response to an operation for a seventh functional area, the information of an update file is determined.

With reference to FIG. 7, the update interface may further include a seventh functional area 70, which is configured to select the update file from the files generated by the target application and determine the information of the update file. The information of the update file may include an identifier of the update file, and may also include a storage format of the update file.

The seventh functional area may include a file adding button, a file deleting button, and a file storage format option. After the terminal determines the third folder, the terminal may display a plurality of files locally acquired from the terminal if a selection instruction for the file adding button is detected. After receiving the selection instruction of the user for any one of the plurality of files, the terminal may determine the file indicated by the selection instruction as the update file, and add the identifier of the update file and the storage format of the update file into the seventh functional area 70. For example, as shown in FIG. 7, the identifier of the update file may be Dr2, and the storage format of the update file may be dwg.

Optionally, after detecting the selection instruction of the user for the storage format option, the terminal may display plurality of candidate file formats. In addition, the terminal may determine the target format dwg as the storage format of the update file after receiving the selection instruction of the user for the target format dwg. After detecting the selection instruction for the update file displayed in the seventh functional area 70, the terminal may delete the update file from the seventh functional area 70 if detecting a selection instruction for a delete button.

In step 405, a first update instruction for a file update entry is acquired.

The update interface may further include a file update entry, and the file update entry may be an update button as shown in FIG. 7. After detecting a selection instruction for the update button, the terminal may acquire the first update instruction for the file update entry. The first update instruction is used to instruct to update the target file in the server to the update file of the target file generated by the target application.

In step 406, the update file is acquired based on the first update instruction.

After the terminal acquires the first update instruction for the file update entry, the terminal may acquire the update file locally from the terminal based on the first update instruction. Optionally, the terminal may acquire the update file displayed in the seventh functional area 70.

In step 407, a second update instruction carrying the update file is sent to the server, based on the target interface of the synchronization plug-in.

After acquiring the update file, the terminal may send the second update instruction carrying the update file to the server. The second update instruction is used to instruct the server to update the target file to the update file. After receiving the second update instruction, the server may replace the target file in the third folder with the update file.

Optionally, the update interface may only include the fifth functional area and the seventh functional area. Alternatively, the update interface may also include the fifth functional area, the sixth functional area, and the seventh functional area. The number and types of the functional areas included in the update interface are not limited in the embodiment of the present disclosure.

In the embodiment of the present disclosure, if the update interface includes the fifth functional area and the seventh functional area, the second update instruction also carries the information of the second folder. After receiving the second update instruction sent by the terminal, the server may replace the target file in the second folder with the update file, and store the information of the second folder in correspondence to the identifier of the update file. The fifth functional area and the seventh functional area can be integrated on one interface (that is, the above synchronization interface). Therefore, compared with the case that the fifth functional area and the seventh functional area are respectively integrated on different interfaces, the efficiency of updating the file is improved.

If the update interface includes the fifth functional area, the sixth functional area, and the seventh functional area, the second update instruction also carries the information of the second folder and the information of the third folder. After receiving the second update instruction sent by the terminal, the server may replace the target file in the third folder with the update file, and store the information of the second folder and the information of the third folder in correspondence to the identifier of the update file. The fifth functional area, the sixth functional area and the seventh functional area can be integrated on one interface (that is, the above synchronization interface). Therefore, compared with the case that the fifth functional area, the sixth functional area, and the seventh functional area are integrated separately on different interfaces, the efficiency of updating the file is improved.

In summary, the embodiment of the present disclosure provides a method for synchronizing a file. After acquiring the synchronization plug-in of the target application, the terminal can acquire the target file based on the first synchronization instruction for the target application, and send the second synchronization instruction carrying the target file to the server based on the target interface of the synchronization plug-in. The terminal can synchronize the target file to the server through the target application for generating the target file in the process of synchronizing the target file to the server, without a need to start the auxiliary application. Therefore, the efficiency of synchronizing the file to the server is improved. In addition, a plurality of functional areas are integrated on one interface for file update, and therefore the efficiency of updating the file is improved.

Figure 8:
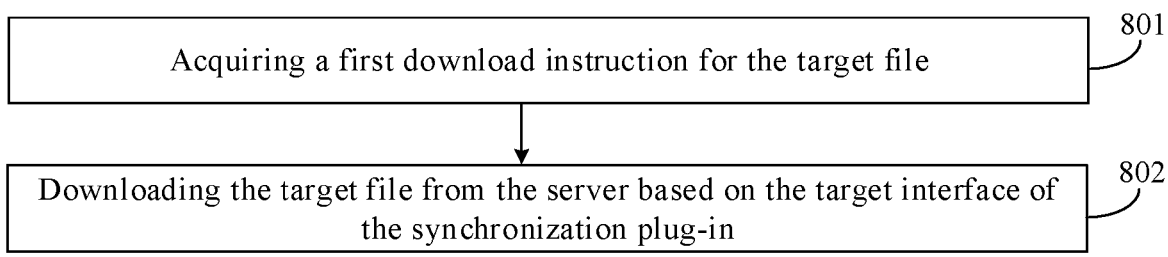
FIG. 8 is a flowchart of still another method for synchronizing a file according to an embodiment of the present disclosure.

FIG. 8 is a flowchart of another method for synchronizing a file according to an embodiment of the present disclosure. The method may be applicable to the terminal 110 shown in FIG. 1. As shown in FIG. 8, the method may include the following steps.

In step 801, a first download instruction for the target file is acquired.

Figure 9:
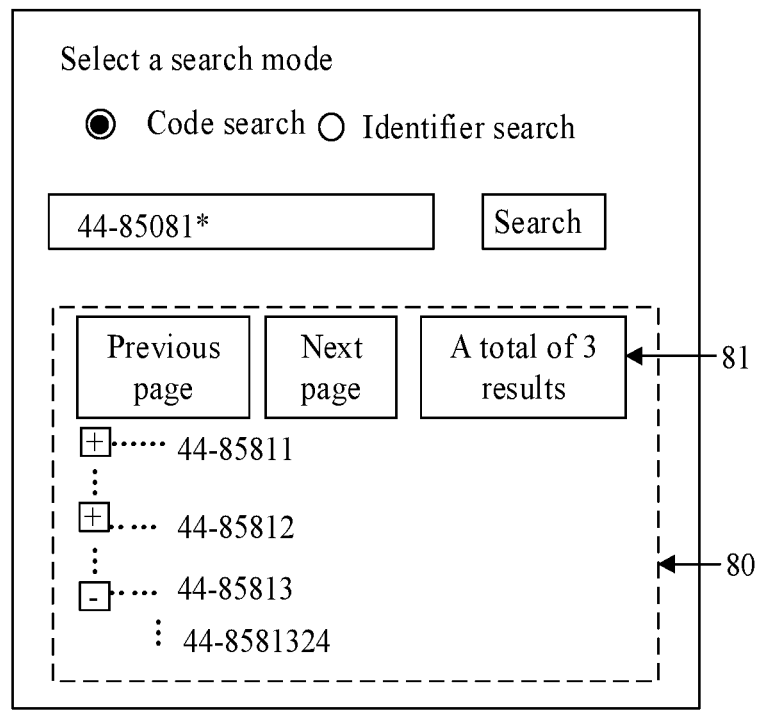
FIG. 9 is a schematic diagram of a search interface according to an embodiment of the present disclosure.

As an optional implementation, a menu page of the synchronization plug-in may also include a search option. The terminal may display a search page after detecting a selection instruction for the search option. As shown in FIG. 9, the search page may include a search mode option, an identifier acquisition box, a search button, and a search result display area 80. The search mode option may include a code search and an identifier search.

After detecting a selection instruction for the code search option, the terminal may acquire a code keyword input by the user from the identifier acquisition box. In addition, the terminal may send the code keyword to the server after detecting a selection instruction for the search button, so that the server acquires the codes of the corresponding multiple folders based on the code keyword. Afterwards, the terminal may receive and display the codes of the multiple first folders in the search result display area 80. After detecting a selection operation for the code of the target file in the multiple folders, the terminal may determine that the first download instruction for the target file is acquired.

For example, as shown in FIG. 9, the terminal may display a first folder 44-85811, a first folder 44-85812, and a first folder 44-85813 in the search result display area 80. After detecting a selection instruction for the first folder 44-85813, the terminal may display a file 44-8581324 in the first folder. When detecting a drag operation for the file 44-8581324, the terminal may determine that a download instruction for the file 44-8581324 is detected. That is, the terminal may determine the file 44-8581324 as the target file, and may determine that the first download instruction for the target file is acquired. The first download instruction carries the identifier of the target file.

Exemplarily, the code keyword may be 44-85081*, wherein 44-85081 indicates that the first 8 digits of the file identifier in a search result is 44-85081, and * indicates that the digit after the 8th digit of the file identifier in the search result is any digit.

Optionally, referring to FIG. 9, the search result display area 80 may also display a previous page button, a next page button, and a quantity text box 81. The previous page button and the next page button may be configured to turn pages to display the plurality of first folders, and the quantity text box 81 is configured to display the quantity of the first folders acquired by the terminal. In the embodiment of the present disclosure, the case that the quantity text box 81 may display "a total of 3 results" is taken as an example for description. In this case, both the previous page and the next page are in a non-editable state.

Figure 10:
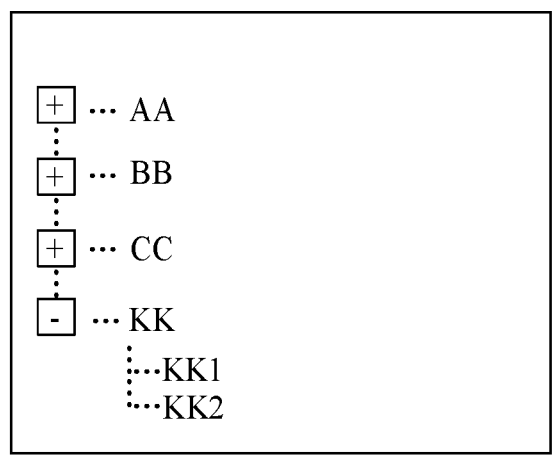
FIG. 10 is a schematic diagram of determining a target file according to an embodiment of the present disclosure.

In the embodiment of the present disclosure, the terminal may acquire the target file through the search option in the menu page of the synchronization plug-in, and may also acquire the target file in other ways. As an optional implementation, referring to FIG. 10 (FIG. 10 only shows a partial area of the menu interface), the menu page of the synchronization plug-in may also display a plurality of first folders. The plurality of first folders may include a first folder AA, a first folder BB, a first folder CC, and a first folder KK. After detecting a selection instruction of the user for the target folder KK in the plurality of first folders, the terminal may display the information of a plurality of files in the target folder KK. The information of the file may include the identifier of the file. For example, if the target folder KK includes two files, the terminal may display the information of the two files, which are KK1 and KK2 respectively. After detecting a drag operation for the target file KK1 in the two files, the terminal may determine that the first download instruction for the target file KK1 is acquired. The first download instruction carries the identifier KK1 of the target file.

In step 802, the target file is downloaded from the server based on the target interface of the synchronization plug-in.

After receiving the first download instruction for the target file, the terminal may send the first download instruction to the server based on the target interface of the synchronization plug-in. After receiving the first download instruction, the server may acquire the target file based on the identifier of the target file carried in the first download instruction, and send the acquired target file to the terminal. After receiving the target file sent by the server, the terminal may store the target file locally.

In the embodiment of the present disclosure, in the process of downloading the target file, since the target file can be directly downloaded through the target application, without the need to start the auxiliary application, the efficiency of downloading files is improved.

In summary, the embodiment of the present disclosure provides a method for synchronizing a file. After acquiring the synchronization plug-in of the target application, the terminal acquires the target file based on the first synchronization instruction for the target application, and sends the second synchronization instruction carrying the target file to the server based on the target interface of the synchronization plug-in. The terminal may synchronize the target file to the server through the target application for generating the target file in the process of synchronizing the target file to the server, without the need to start the auxiliary application, so that the efficiency of synchronizing the file to the server is improved. In addition, in the process of downloading the target file, since the target file may be downloaded directly through the target application, there is no need to start the auxiliary application, which improves the efficiency of downloading files.

Optionally, the sequence of the steps of the method for synchronizing a file according to the embodiments of the present disclosure may be adjusted appropriately, and the steps can also be deleted according to the situation. For example, the file upload process provided in step 303 to step 306 may be deleted. The file update process provided in step 401 to step 407 may also be deleted according to the situation. The file download process provided in step 801 and step 802 may also be deleted according to the situation. Any variations to the method easily derived by a person of ordinary skill in the art shall fall within the protection scope of the present disclosure, which is not repeated herein.

Figure 11:
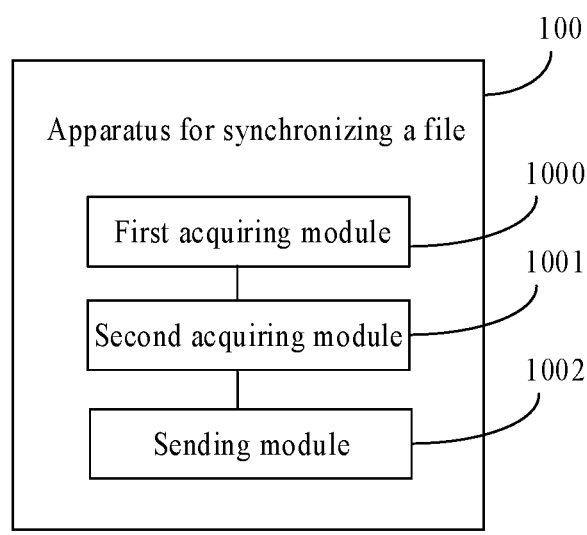
FIG. 11 is a block diagram of an apparatus for synchronizing a file according to an embodiment of the present disclosure.

FIG. 11 is a block diagram of an apparatus for synchronizing a file 100 according to an embodiment of the present disclosure. The apparatus for synchronizing a file may be the terminal 110 shown in FIG. 1. As shown in FIG. 11, the apparatus device may include: a first acquiring module 1000, configured to acquire a first synchronization instruction for a target application, wherein the first synchronization instruction is used to instruct to synchronize a target file generated by the target application to a server of an auxiliary application, the target application is a graphics drawing application, and the auxiliary application is a PLM application; a second acquiring module 1001, configured to acquire the target file based on the first synchronization instruction; and a sending module 1002, configured to send a second synchronization instruction carrying the target file to the server based on a target interface of a synchronization plug-in of the target application, wherein the target interface of the synchronization plug-in is configured to communicate with the server.

In summary, the embodiment of the present disclosure provides an apparatus for synchronizing a file. The terminal can acquire the target file based on the first synchronization instruction, and sends the second synchronization instruction carrying the target file to the server based on the target interface of the synchronization plug-in. The terminal can synchronize the target file to the server through the target application for generating the target file in the process of synchronizing the target file to the server. Therefore, there is no need to start the auxiliary application, which improves the efficiency of synchronizing the file to the server.

Optionally, the first acquiring module 1000 is configured to: display a synchronization interface of the target application based on the synchronization plug-in, wherein the synchronization interface includes a file synchronization entry; and acquire a first synchronization instruction for the file synchronization entry.

Figure 12:
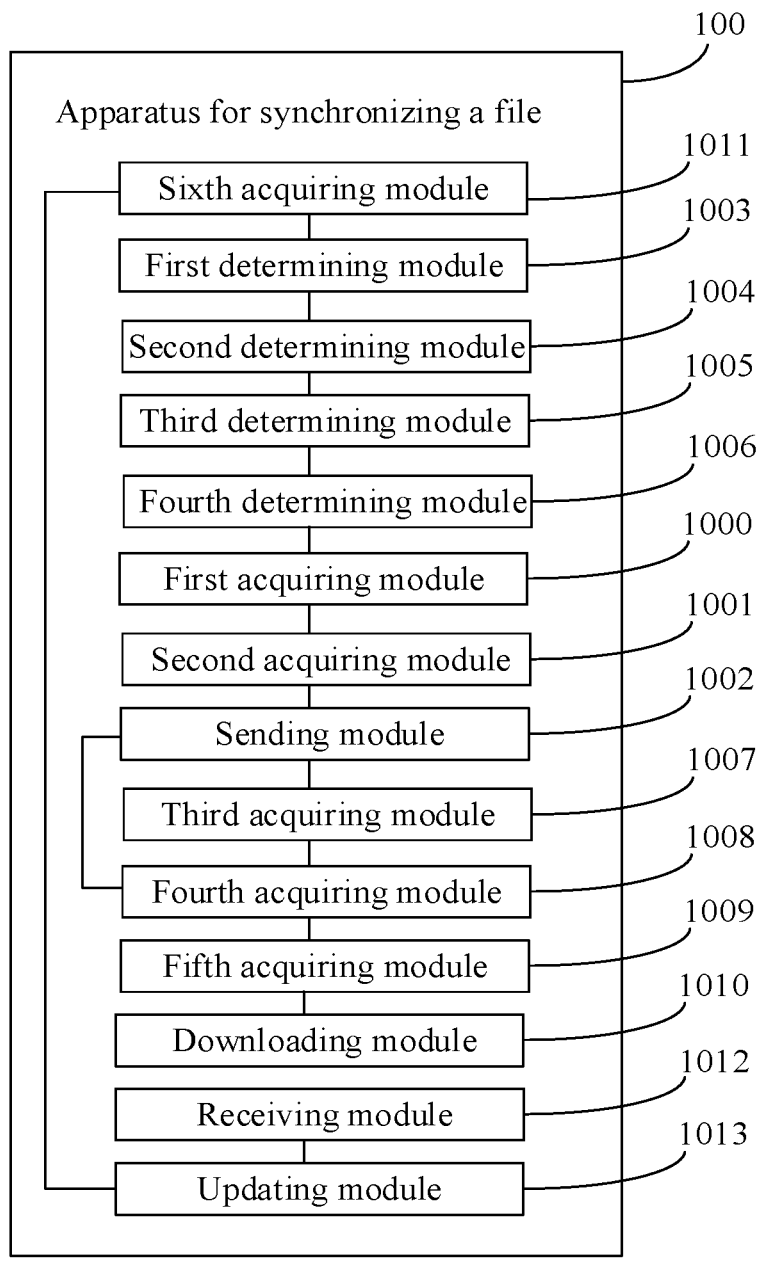
FIG. 12 is a block diagram of another apparatus for synchronizing a file according to an embodiment of the present disclosure.

Optionally, the synchronization interface further includes: a first functional area and a second functional area. The first functional area is configured to set information of a first folder, and the first folder is configured to store the target file. The second functional area is configured to set information of a second folder, and the second folder is a folder configured to store the target file in the first folder. Referring to FIG. 12, the apparatus further includes: a first determining module 1003, configured to determine the information of the first folder in response to an operation for the first functional area, before the first acquiring module 1000 acquires the first synchronization instruction; and a second determining module 1004, configured to determine the information of the second folder in response to an operation for the second functional area, before the first acquiring module 1000 acquires the first synchronization instruction. The second synchronization instruction further carries: the information of the first folder and the information of the second folder.

Optionally, the synchronization interface further includes: a third functional area. The third functional area is configured to set information of a third folder, and the third folder is a folder configured to store the target file in the second folder. Referring to FIG. 12, the apparatus further includes: a third determining module 1005, configured to determine the information of the third folder in response to an operation for the third functional area, before the first acquiring module 1000 acquires the first synchronization instruction for the target application. The second synchronization instruction further carries: the information of the third folder.

Optionally, the synchronization interface further includes: a fourth functional area, and the fourth functional area is configured to set information of a target file in files generated by the target application. Referring to FIG. 12, the apparatus further includes: a fourth determining module 1006, configured to determine the information of the target file in response to an operation for the fourth functional area, before the first synchronization instruction for the target application is acquired.

Optionally, continuing to refer to FIG. 12, the apparatus further includes: a third acquiring module 1007, configured to acquire a first update instruction for the target application after the target file is synchronized to the server, wherein the first update instruction is used to instruct to update the target file in the server to an update file of the target file generated by the target application; and a fourth acquiring module 1008, configured to acquire the update file based on the first update instruction.

The sending module 1002 is further configured to send a second update instruction carrying the update file to the server based on the target interface of the synchronization plug-in, wherein the second update instruction is used to instruct the server to update the target file to the update file.

Optionally, the third acquiring module 1007 is configured to: display an update interface of the target application based on the synchronization plug-in, wherein the update interface includes a file update entry; and acquire the first update instruction for the file update entry.

Optionally, the update interface further includes: a fifth functional area and a sixth functional area. The fifth functional area is configured to select the information of the second folder in the server, and the sixth functional area is configured to select the information of the third folder in the server.

The second determining module 1004 is further configured to determine the information of the second folder in response to an operation for the fifth functional area, before the first update instruction for the target application is acquired.

The third determining module 1005 is further configured to determine the information of the third folder in response to an operation for the sixth functional area, before the first update instruction for the target application is acquired.

The second update instruction further carries: the information of the second folder and the information of the third folder.

Optionally, the update interface further includes: a seventh functional area, and the seventh functional area is configured to set the information of the update file in the files generated by the target application. The fourth determining module 1006 is further configured to determine the information of the update file in response to an operation for the seventh functional area, before the first update instruction for the target application is acquired.

Optionally, referring to FIG. 12, the apparatus further includes: a fifth acquiring module 1009, configured to acquire a first download instruction for the target application after the target file is synchronized to the server, wherein the first download instruction is used to instruct to download the target file in the server; and a downloading module 1010, configured to download the target file from the server based on the target interface of the synchronization plug-in.

Optionally, referring to FIG. 12, the apparatus further includes: a sixth acquiring module 1011, configured to acquire the synchronization plug-in of the target application before the sending module 1002 sends the second synchronization instruction carrying the target file to the server of the auxiliary application.

Optionally, the sixth acquiring module 1011 is configured to: if a selection instruction for a synchronization plug-in acquisition button is detected, send a synchronization plug-in acquisition instruction to a plug-in server; and receive the synchronization plug-in sent by the plug-in server in response to the synchronization plug-in acquisition instruction.

Optionally, the display interface of the target application includes a synchronization plug-in update button. As shown in FIG. 12, the apparatus further includes:

a receiving module 1012 configured to receive a first version number of the synchronization plug-in sent by the plug-in server;

the sending module 1002 is further configured to, if a selection instruction for the synchronization plug-in update button is detected, send a synchronization plug-in update instruction to the plug-in server;

the receiving module 1012 is further configured to receive a second version number sent by the plug-in server in response to the synchronization plug-in update instruction;

the sending module 1002 is further configured to, if the second version number is greater than the first version number, send an update determining instruction to the plug-in server;

the receiving module 1012 is further configured to receive the synchronization plug-in of the second version number sent by the plug-in server in response to the update determining instruction; and an updating module 1013, configured to update the synchronization plug-in of the first version number based on the synchronization plug-in of the second version number.

In summary, the embodiment of the present disclosure provides an apparatus for synchronizing a file. After acquiring the synchronization plug-in of the target application, the terminal acquires the target file based on the first synchronization instruction for the target application, and sends the second synchronization instruction carrying the target file to the server based on the target interface of the synchronization plug-in. Since the terminal can synchronize the target file to the server through the target application for generating the target file in the process of synchronizing the target file to the server, without the need to start the auxiliary application, the efficiency of synchronizing the file to the server is improved.

Figure 13:
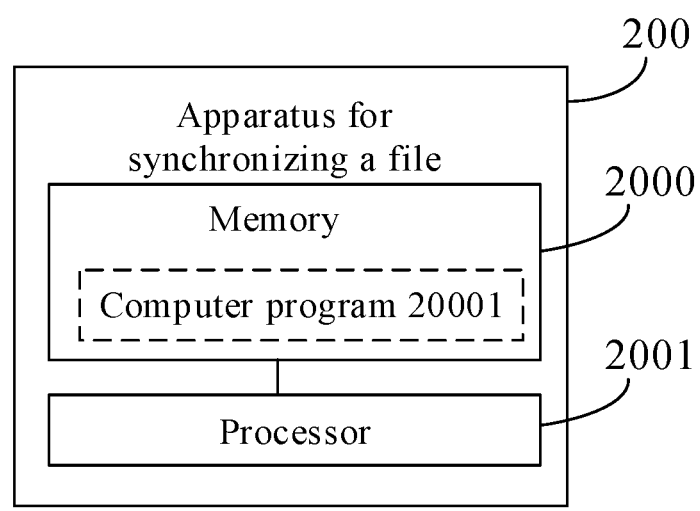
FIG. 13 is a block diagram of yet another apparatus for synchronizing a file according to an embodiment of the present disclosure.

An embodiment of the present disclosure provides an apparatus for synchronizing a file 200. As shown in FIG. 13, the apparatus 200 may include a memory 2000, a processor 2001, and a computer program 20001 stored on the memory 2000. The processor 2001, when executing the computer program 20001, implements the method for synchronizing a file in the above embodiments.

The processor 2001 may include one or more processing cores. The processor 2001 may be implemented in at least one hardware of a digital signal processing (DSP), a field-programmable gate array (FPGA), and a programmable logic array (PLA). The processor 2001 may also include a main processor and a coprocessor. The main processor is a processor for processing data in an awake state, and is also called a central processing unit (CPU). The coprocessor is a low-power-consumption processor for processing data in a standby state. In some embodiments, the processor 2001 may be integrated with a graphics processing unit (GPU).

The memory 2000 may include one or more computer-readable storage mediums, which can be non-transitory. The memory 2000 may further include a high-speed random access memory, as well as a non-volatile memory, such as one or more disk storage devices and flash storage devices.

An embodiment of the present disclosure provides a system for synchronizing a file. The system for synchronizing a file may include the terminal 110 and the server 120 shown in FIG. 1. The terminal may include the apparatus for synchronizing a file in the aforesaid embodiments.

An embodiment of the present disclosure provides a computer-readable storage medium storing instructions therein. The instructions, when running on a computer, cause the computer to execute the method for synchronizing a file in the aforesaid embodiments.

Described above are merely optional embodiments of the present disclosure, and are not intended to limit the present disclosure. Within the spirit and principles of the present disclosure, any modifications, equivalent substitutions, improvements, and the like are within the protection scope of the present disclosure.

What is claimed is:

1. A method for synchronizing a file, comprising:
acquiring a first synchronization instruction for a target application, wherein the first synchronization instruction is used to instruct to synchronize a target file generated by the target application to a server of an auxiliary application, the target application is a graphics drawing application, and the auxiliary application is a product lifecycle management (PLM) application;
acquiring the target file based on the first synchronization instruction; and
sending a second synchronization instruction carrying the target file to the server based on a target interface of a synchronization plug-in of the target application, wherein the target interface of the synchronization plug-in is configured to communicate with the server;
wherein before sending the second synchronization instruction carrying the target file to the server, the method further comprises:
acquiring the synchronization plug-in of the target application;
wherein a display interface of the target application comprises a synchronization plug-in acquisition button; and
acquiring the synchronization plug-in of the target application comprises:
sending a synchronization plug-in acquisition instruction to a plug-in server, if a selection instruction for the synchronization plug-in acquisition button is detected; and
receiving the synchronization plug-in sent by the plug-in server in response to the synchronization plug-in acquisition instruction; and
wherein the display interface of the target application comprises a synchronization plug-in update button; and the method further comprises:
receiving a first version number of the synchronization plug-in sent by the plug-in server;
sending a synchronization plug-in update instruction to the plug-in server, if a selection instruction for the synchronization plug-in update button is detected;
receiving a second version number sent by the plug-in server in response to the synchronization plug-in update instruction;
sending an update determining instruction to the plug-in server, if the second version number is greater than the first version number;
receiving a synchronization plug-in of the second version number sent by the plug-in server in response to the update determining instruction; and
updating a synchronization plug-in of the first version number based on the synchronization plug-in of the second version number.

2. The method according to claim 1, wherein acquiring the first synchronization instruction for the target application comprises:
displaying a synchronization interface of the target application based on the synchronization plug-in, wherein the synchronization interface comprises a file synchronization entry; and
acquiring the first synchronization instruction for the file synchronization entry.

3. The method according to claim 2, wherein the synchronization interface further comprises a first functional area and a second functional area, the first functional area is configured to set information of a first folder, the first folder is configured to store the target file, the second functional area is configured to set information of a second folder, and the second folder is a folder configured to store the target file in the first folder;
before acquiring the first synchronization instruction, the method further comprises:
determining the information of the first folder, in response to an operation for the first functional area; and
determining the information of the second folder, in response to an operation for the second functional area; and
the second synchronization instruction further carries the information of the first folder and the information of the second folder.

4. The method according to claim 3, wherein the synchronization interface further comprises a third functional area, the third functional area is configured to set information of a third folder, and the third folder is a folder configured to store the target file in the second folder;
  before acquiring the first synchronization instruction for the target application, the method further comprises:
    determining the information of the third folder, in response to an operation for the third functional area; and
  the second synchronization instruction further carries the information of the third folder.

5. The method according to claim 2, wherein the synchronization interface further comprises a fourth functional area, and the fourth functional area is configured to set information of the target file in files generated by the target application; and
  before acquiring the first synchronization instruction for the target application, the method further comprises:
    determining the information of the target file, in response to an operation for the fourth functional area.

6. The method according to claim 1, wherein after synchronizing the target file to the server, the method further comprises:
  acquiring a first update instruction for the target application, wherein the first update instruction is used to instruct to update the target file in the server to an update file of the target file generated by the target application;
  acquiring the update file based on the first update instruction; and
  sending a second update instruction carrying the update file to the server, based on the target interface of the synchronization plug-in, wherein the second update instruction is used to instruct the server to update the target file to the update file.

7. The method according to claim 6, wherein acquiring the first update instruction for the target application comprises:
  displaying an update interface of the target application based on the synchronization plug-in, wherein the update interface comprises a file update entry; and
  acquiring the first update instruction for the file update entry.

8. The method according to claim 7, wherein the update interface further comprises a fifth functional area and a sixth functional area, the fifth functional area is configured to select information of the second folder in the server, and the sixth functional area is configured to select the information of the third folder in the server;
  before acquiring the first update instruction for the target application, the method further comprises:
    determining the information of the second folder, in response to an operation for the fifth functional area; and
    determining the information of the third folder, in response to an operation for the sixth functional area; and
  the second update instruction further carries the information of the second folder and the information of the third folder.

9. The method according to claim 6, wherein the update interface further comprises a seventh functional area, and the seventh functional area is configured to set information of the update file in the files generated by the target application; and before acquiring the first update instruction for the target application, the method further comprises: determining the information of the update file, in response to an operation for the seventh functional area.

10. The method according to claim 1, wherein after synchronizing the target file to the server, the method further comprises:
  acquiring a first download instruction for the target application, wherein the first download instruction is used to instruct to download the target file in the server; and
  downloading the target file from the server based on the target interface of the synchronization plug-in.

11. An apparatus for synchronizing a file, comprising a memory, a processor, and a computer program stored on the memory, wherein the processor, when executing the computer program, implements the method for synchronizing a file according to claim 1.

12. The apparatus according to claim 11, wherein the processor is configured to:
  display a synchronization interface of the target application based on the synchronization plug-in, wherein the synchronization interface comprises a file synchronization entry; and
  acquire the first synchronization instruction for the file synchronization entry.

13. The apparatus according to claim 12, wherein the synchronization interface further comprises a first functional area and a second functional area, the first functional area is configured to set information of a first folder, the first folder is configured to store the target file, the second functional area is configured to set information of a second folder, and the second folder is a folder configured to store the target file in the first folder;
  the processor is further configured to:
  determine the information of the first folder in response to an operation for the first functional area, before acquiring the first synchronization instruction; and
  determine the information of the second folder in response to an operation for the second functional area, before acquiring the first synchronization instruction; and
  the second synchronization instruction further carries the information of the first folder and the information of the second folder.

14. The apparatus according to claim 13, wherein the synchronization interface further comprises a third functional area, the third functional area is configured to set information of a third folder, and the third folder is a folder configured to store the target file in the second folder;
  the processor is further configured to determine the information of the third folder in response to an operation for the third functional area, before acquiring the first synchronization instruction; and
  the second synchronization instruction further carries the information of the third folder.

15. A system for synchronizing a file, comprising: a terminal and a server, wherein the terminal comprises the apparatus for synchronizing a file according to claim 11.

16. A non-transitory computer-readable storage medium storing instructions therein, wherein the instructions, when running on a computer, causes the computer to execute the method for synchronizing a file according to claim 1.

* * * * *